INVENTORS
EDWARD P. HARRIS
CLETUS L. MOORMAN
THEIR ATTORNEY

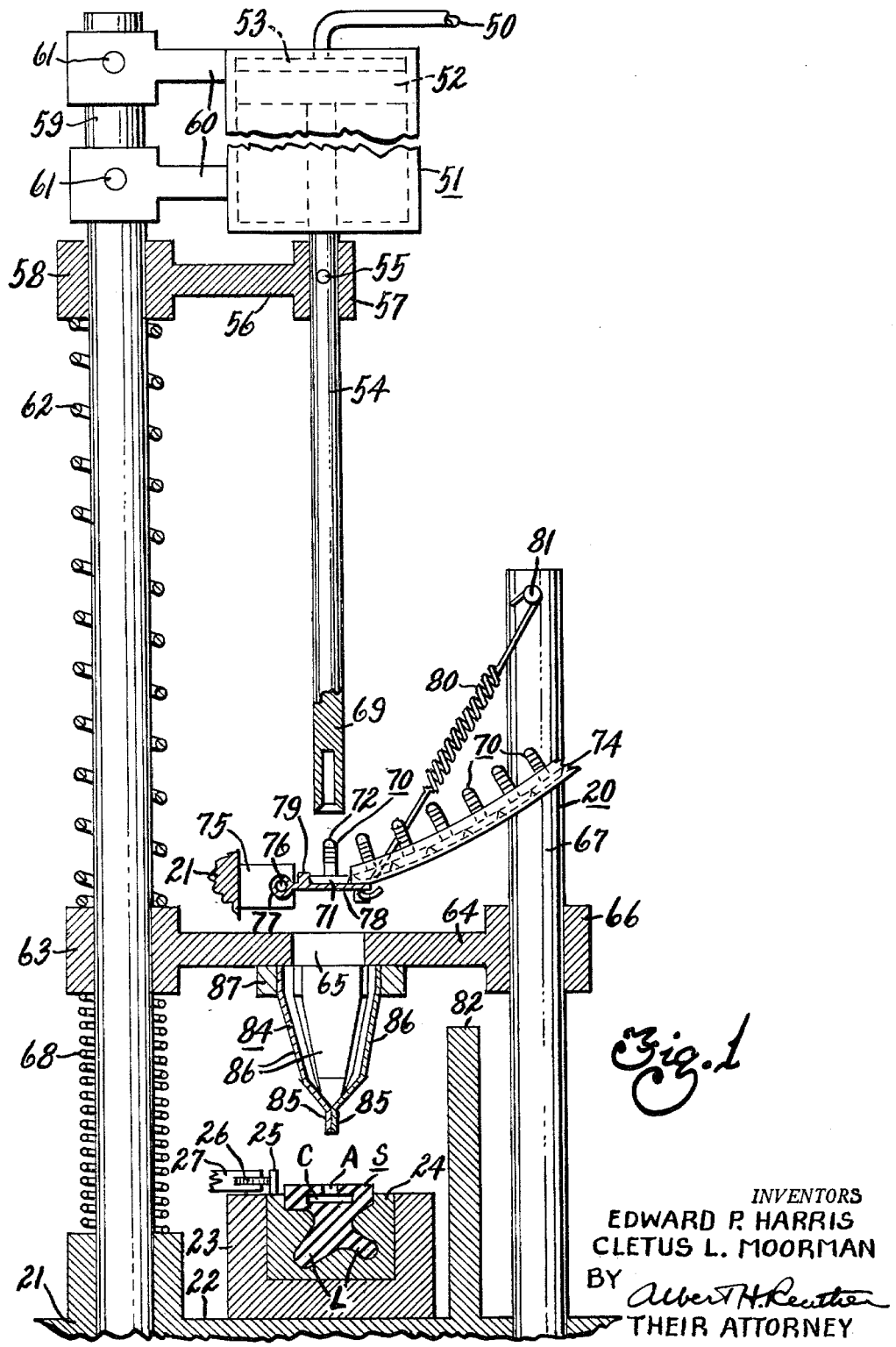

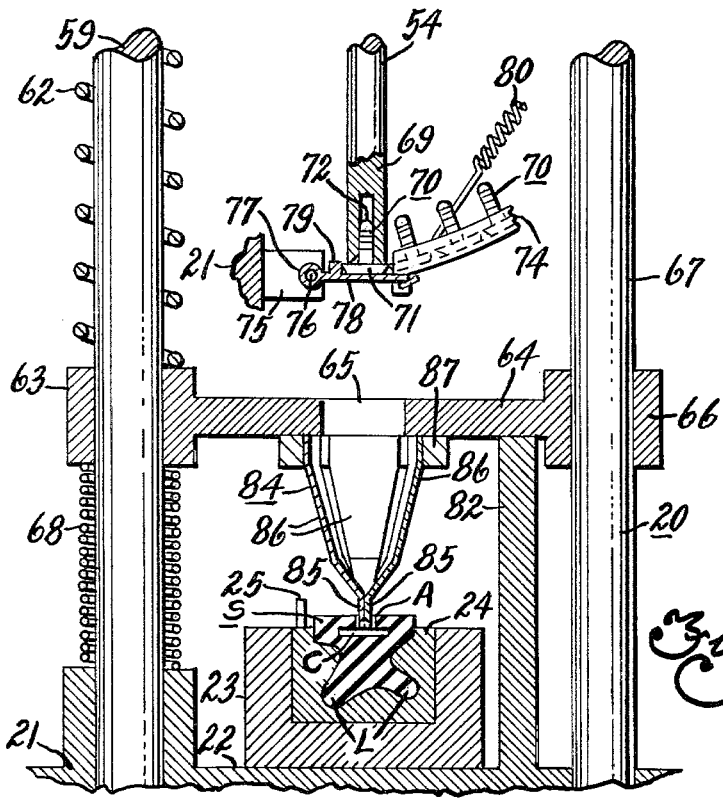

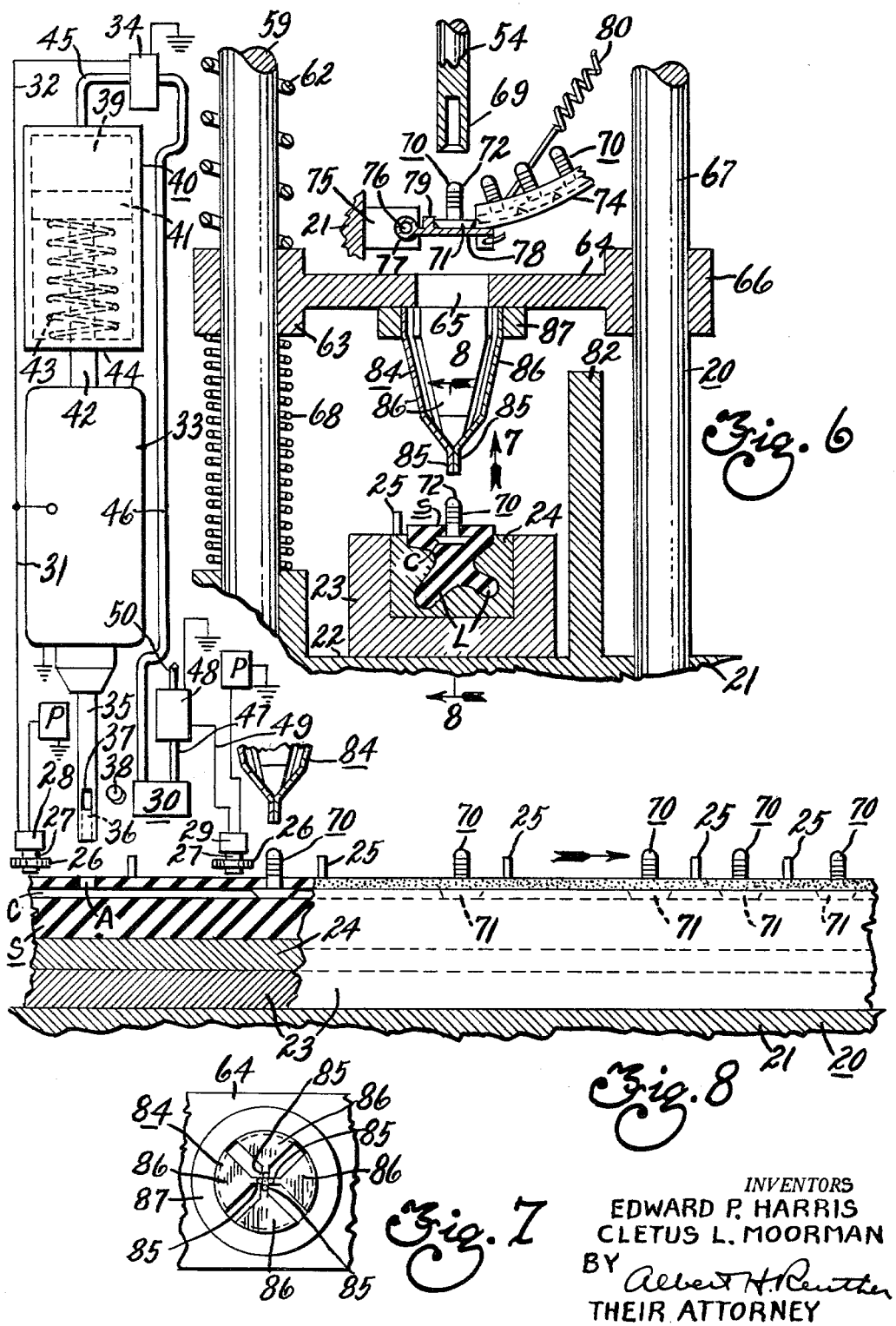

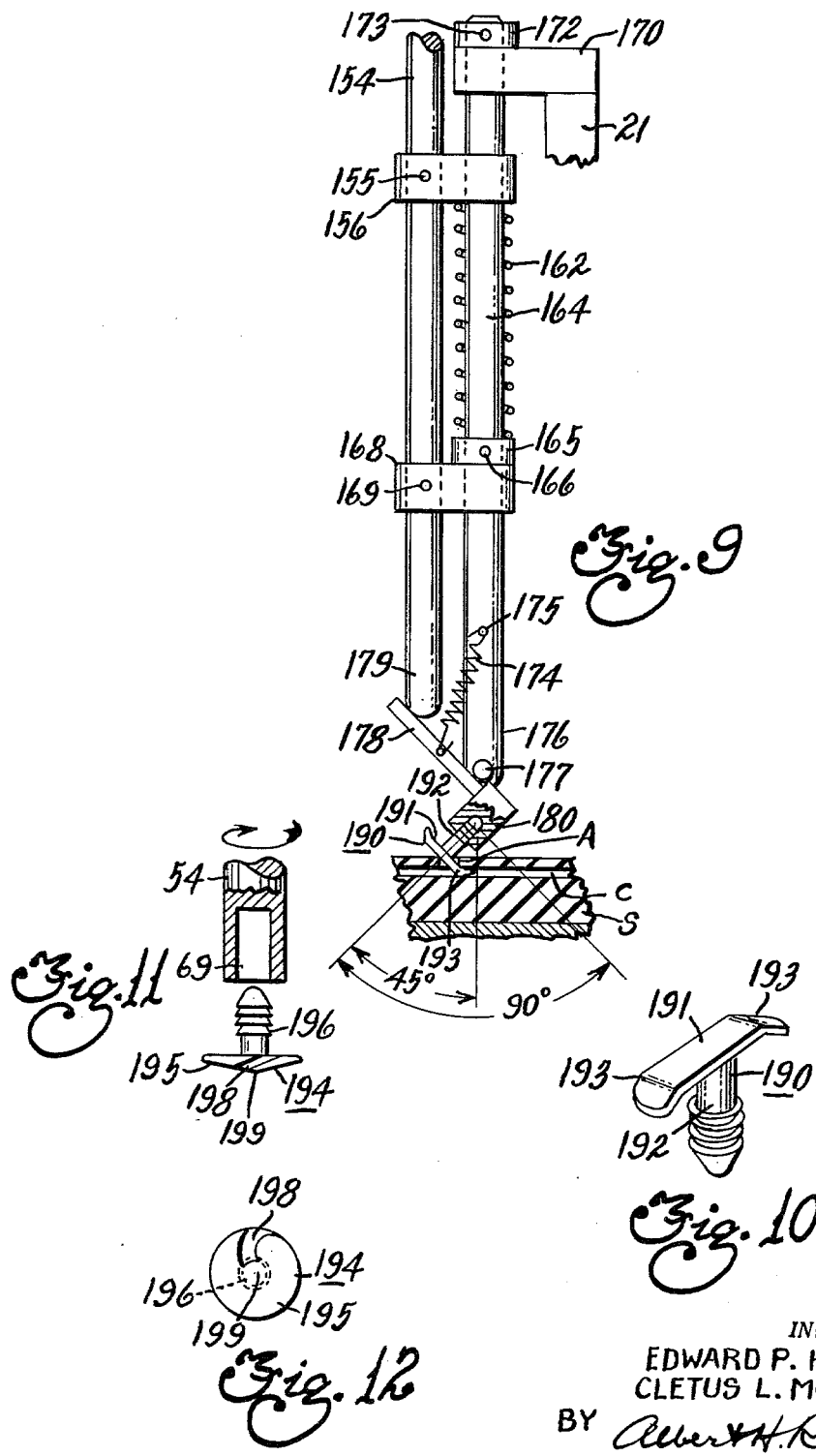

United States Patent Office 3,199,184
Patented Aug. 10, 1965

3,199,184
ELASTOMERIC SEALING STRIP AND MOUNTING MEANS ASSEMBLY PROCEDURE
Edward P. Harris, Dayton, and Cletus L. Moorman, Trotwood, Ohio, assignors to General Motors Corporation, Detroit, Mich., a corporation of Delaware
Filed June 22, 1961, Ser. No. 126,419
7 Claims. (Cl. 29—429)

This invention relates to a method of manufacture to assemble elastomeric sealing strip means and fastening devices to each other.

An object of this invention is to provide a new and improved procedure that standardizes elastomeric sealing strip and mounting device assembly as a product for facilitating installation thereof subsequently on motor vehicles mass produced where is minimum of production control and inspection are desirable to save time and reduce cost of labor and material.

Another object of this invention is to provide an elastomeric sealing strip and mounting device assembly procedure including steps of feeding the elastomeric sealing strip along a predetermined path, aperturing the sealing strip in predetermined locations so as to provide access to a longitudinally extending cavity therein, dilating the elastomeric sealing strip in a location where said aperturing occurred, inserting a plastic nail-like fastening device at least to have a head portion thereof fit into the cavity during said dilating, and releasing the plastic fastening device to remain with the head portion thereof in the cavity.

Another object of this invention is to provide a method for installation of plastic nail-like fastening devices in predetermined locations along an elastomeric sealing strip having a longitudinally extending cavity adjacent to an underside thereof and including a track-like feeder fixture in which the elastomeric sealing strip is retained for movement in a predetermined path along which at least a pair of stations can be provided to stop movement of the feeder fixture first to permit a hollow drill to be energized to aperture the strip laterally inwardly to provide access to the longitudinally extending cavity and second to effect actuation of inserter mechanism for feed of plastic nail-like fastening devices along a chute trap door pivotable in response to movement of a hollow-ended driver-like plunger which holds a stem portion of the fastening device and which moves the fastening device while simultaneously effecting expansion of an aperture in the sealing strip by passage of the plunger and head portion centrally through laterally outwardly spreadable finger means that peripherally engage the strip defining an aperture, the head portion of the fastening device and finger means maintaining positioning of the head portion in the strip cavity during plunger retraction and the head portion alone being retained in the cavity with the stem portion projecting through the aperture upon retraction of the finger means also.

A further object of this invention is to provide a method for installation of plastic nail-like fastening devices in predetermined locations along an elastomeric sealing strip having a longitudinally extending cavity adjacent to an underside thereof and including feeder means along which the elastomeric sealing strip can move in a predetermined path having a first stop-like station where a drill means makes a hole laterally in the strip to the cavity therein and subsequently in a further stop-like station a plastic nail-like fastening device including a stem portion and integral oblong head portion is moved on a rocker arm with a stem-portion receiving recess located angularly to an axis of a driver-like plunger which can pivot the rocker arm to a predetermined position longitudinally of the oblong head portion of which one end binds into the hole so as to expand the elastomeric sealing strip sufficiently to dilate the hole until an opposite end of the head portion can snap-fit into the cavity followed by retraction of the arm and plunger to leave a stem portion of the fastening device projecting laterally through the hole.

Another object of this invention is to provide a method of assembling a fastening device having a stem-portion integral centrally with a head portion provided with a semi-arcuate partial spiral cut-out slot to facilitate fitting of the head portion to a cavity of a sealing strip of elastomeric material laterally apertured to a size hole substantially of a diameter equal to that of the stem portion which can be held by a hollow-ended plunger for axially twisting by the plunger while the spiral slot permits threading of the head portion through the hole into the cavity of the sealing strip.

Further objects and advantages of the present invention will be apparent from the following description, reference being had to the accompanying drawings wherein preferred embodiments of the present invention are clearly shown.

In the drawings:

FIGURE 1 is a partially sectioned view of features in accordance with the present invention for assembly of plastic nail-like fastening devices into predetermined locations along one side of an elastomeric sealing strip.

FIGURE 2 shows components prepared to effect fit of a fastening device through an aperture or hole in a sealing strip having a longitudinally extending cavity in which a laterally extending head portion of the fastening device can be retained.

FIGURE 3 shows trap door displacement and dilating or spreading of the elastomeric sealing strip specifically at the hole to permit plunger insertion of the head portion into the cavity.

FIGURE 6 shows reset of components for another plunger insertion of a further fastening device to fit with the sealing strip.

FIGURE 7 is a view taken in the direction of arrow 7 in FIGURE 6.

FIGURE 8 is a fragmentary cross-sectional view taken along line 8—8 in FIGURE 6.

FIGURE 9 is an elevational view of another plunger mechanism for use in accordance with the present invention.

FIGURE 10 is a perspective view of a fastening device for installation by the mechanism of FIGURE 9.

FIGURES 11 and 12 illustrate side and end views of a further fastening device which can be fitted to an elastomeric sealing strip by plunger twisting for threading of a head portion of the fastening device through a sealing strip hole into a cavity extending longitudinally along one side of the sealing strip.

Figure 4:
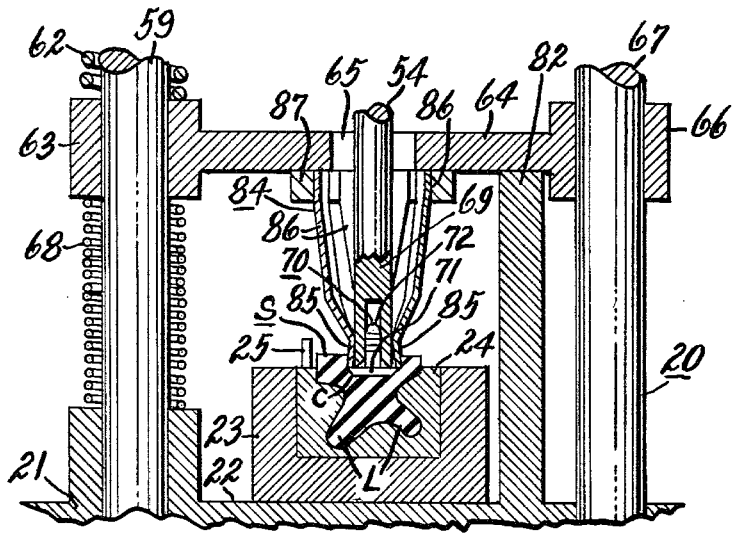
FIGURES 4 and 5 represent retraction of the plunger and retention of the head portion in the cavity.

FIGURE 1 illustrates apparatus generally indicated by numeral 20 and including a frame or base 21 with a table-like surface 22 along with a channel-like fixture or U-shaped track 23 is mounted in a substantially central location. This track 23 serves as a guide for a track-like feeder fixture or means 24 having a longitudinally extending slotted configuration contoured to complement outer peripheral surfaces of a sealing strip means of elastomeric material adapted to be fitted thereto for purposes described herein. It is to be noted that the sealing strip means of elastomeric material together with the feeder means 24 can move longitudinally and centrally along the U-shaped track 23. It is to be understood that the sealing strip of elastomeric material can have a predetermined length corresponding to peripheral distance, for example, around a motor vehicle door where the sealing strip means is to be located as a weather seal. The sealing strip means can be belt-like or longitudinal in configuration depending upon the final use to be made therof. In any event, the sealing strip means as designated by a reference S includes a longitudinally extending cavity C and apertures or holes A are formed extending laterally therefrom in a direction away from sealing lip portions L integral with the strip S of elastomeric material. For further disclosure as to the sealing strip per se reference can be made to a copending application S.N. 71,463, filed November 25, 1960, now Patent 3,110,938, Beck et al. issued November 19, 1963, and belonging to the assignee of the present invention. The sealing strip can be extruded or molded to have a preformed shape subject to mounting adjacent to a vehicle door, for example, which can have an irregular configuration. In view of such irregular configuration it is necessary to provide fastening means in predetermined locations for holding the sealing strip in engagement with a surface of the door. Sometimes a series of three or four mounting panel apertures are provided closely adjacent to each other such that a relatively sharp bend can be made to fit a sealing strip relative to a door contour and the like. At other times it is necessary to have suitable fastening devices spaced relatively farther apart and a need exists for apparatus and a method for fitting such fastening devices to sealing strips of this type.

The feeder means can be gear driven to pass through the U-shaped track 23 and suitable rollers can press fit the elastomeric strip material including the lip portions L into the feeder means 24 prior to reaching locations where movement of the feeder means 24 is interrupted to permit functioning in accordance with the present invention. In view of the elastomeric and resilient nature of the sealing strip S it is advisable to overdrive the feeder means 24 to offset drag resulting from the elastomeric material as it is fitted into the slotted configuration of the feeder means 24. A rack and gear drive can be provided to move the feeder means or nesting fixture 24 and predetermined stop positions will permit freeing the strip of tension during drilling and inserting operations in accordance with the present invention. Such stops for drilling and inserting operations can occur at uniformly as well as irregularly located intervals at any span of distance in accordance with provision of posts or switch pins 25 carried by the feeder means or nesting fixture 24. These posts or pins 25 project upwardly adjacent to one side or edge of the feeder means or nesting fixture 24 and periodically can engage rollers 26 journalled relative to switch-actuating arms 27 at both first and second locations. Axial shift of switch arms 27 can effect opening and closing of switch means 28 and 29, respectively, in the two spaced locations and these switches 28 and 29 can operate either an electric motor energizable for drill operation and/or solenoid valve means to control fluid motors for indexing the drill means and/or inserting components in accordance with the present invention.

Referring to FIGURE 8 there is shown a source of fluid under pressure and generally indicated by numeral 30. It would be possible to use hydraulic fluid though preferably a pneumatic system with air under pressure would be provided since maintenance and handling of pneumatic systems can be more practical. As indicated in FIGURE 8, the switch 28 can be electrically connected by leads or wires 31 and 32 which are connected to an electric motor 33 as well as a solenoid valve 34 and the like. The electric motor can drive a drill means 35 having a hollow interior 36 and a lateral opening 37 such that an annular piece 38 of elastomeric material is removed from a hole or aperture A in the elastomeric strip S. The solenoid valve 34 can control supply of fluid medium under pressure to a space or cavity 39 inside an actuator 40 having a movable piston 41 therein. A rod 42 secured at one end to the piston 41 can be attached at an opposite end to the electric motor 33 indexable up and down to effect drilling and aperturing of the elastomeric strip S. A coil spring 43 can be provided between an underside of the piston 41 and surrounding the rod 42 so as to bias the piston 41 normally upwardly away from a centrally apertured bottom 44 of the actuator 40. A fluid conduit 45 can supply air under pressure in accordance with operation of the solenoid valve which forms no part of this invention and a supply line 46 can be provided between the solenoid valve 34 and the source of fluid under pressure as indicated by numeral 30.

Further referring to FIGURE 8, it is noted that another fluid supply line 47 can be connected between the source 30 and a solenoid valve 48 energizable by way of a wire connection 49 to the micro switch means 29. A fluid conduit 50 can interconnect the solenoid switch controlled valve 48 and an acuator 51 having a piston 52 movable therein. A portion of the fluid conduit 50 is shown in both FIGURES 1 and 8. The actuator 51 has a cylindrical space 53 therein and fluid under pressure can effect movement of the piston 52 downwardly so as to shift a rod-like plunger or inserting device 52 carried by the piston 52. This inserting device 54 can also be referred to as a driver or driving means because components of structure illustrated in FIGURE 1 are connected thereto to effect either direct or indirect movement thereof as will be described in further detail.

A transverse pin or dowel 55 is fitted through a passage in the plunger or driving device and a link or interconnecting arm 56 having a cylindrical end portion 57 integral therewith is caused to move downwardly also when the plunger or driving device 54 is moved downwardly. The link or arm 56 also includes an integral sleeve or bearing portion 58 which can slide along a post or rod 59 fixed relative to the base 21. It is to be noted that suitable support bracket means 60 can be secured by posts or pin-like dowels 61 for mounting the actuator 51 in a predetermined location. It is noted that these dowels or posts can be threaded so as to permit adjustable positioning of the acuator if necessary.

A relatively stiff and rigid compression spring means 62 is provided concentrically around the post 59 and abuts at one end against the cylindrical sleeve portion 58 of the link or arm 56. An opposite end of the spring 62 abuts against a bearing end 63 of a movable plate 64 centrally apertured to have a hole 65 and integral with a further apertured bearing end 66. The bearing end 66 is adapted to slide and engage a secondary guide post 67 such that the plate 64 can move up and down in a predetermined to and fro path. Another coil spring means 68 is located concentrically around a lower portion of the post 59 and this spring means 68 is more resilient and easily compressible axially prior to compression of the spring means 62 noted earlier. Thus, during initial movement of the plunger or driving device 54 the relatively stiff and rigid compression spring 62 serves as a positive connection to effect shifting of the plate member 64 against bias of the spring means 68. This downward movement of the plate 64 under the rigid urging of spring 62 effects a shift of the bearing end 63 longitudinally along the outer periphery of the post 59 until the structural components reach a positioning indicated in FIGURE 2.

The plunger or driving means 54 during downward movement to effect shifting of the plate 64 can simultaneously result in engagement of a plunger end 69 having a hollow or countersunk interior for engaging a fastening device generally indicated by numeral 70. Each fastening device 70 includes a head portion 71 as well as a shank-like stem portion 72 integral therewith. For further details as to the specific structural arrangement of each of the fastening devices 70 reference can be made to a copending application S.N. 118,918—Moorman filed concurrently herewith now Patent 3,139,784—Moorman issued July 7, 1964 and belonging to the assignee of the present invention.

The fastening devices 70 are supplied from a suitable vibrator-type storage bin and the like to a channel-like chute 74 suitably supported relative to the base 21 or other fixed structure of the apparatus. A projection 75 fixed to the base 21 or an extension thereof as indicated in FIGURES 1–3 and 6 can provide a pivot connection 76 for an end 77 of a trap door 78. The trap door 78 has an abutment 79 on an upper surface thereof and this abutment 79 is engaged by a head portion 71 of the fastening device 70 as shown in FIGURES 1, 2 and 6. The stem portion 72 of each fastening device 70 can have radially outwardly extending locking ring means described more fully in the copending application of S.N. 118,918, Moorman noted earlier as Patent 3,139,784, Moorman and these ring means frictionally engage an inner periphery of the hollow end 69 of the plunger or driving device 54. It is to be noted that the outer diameter or dimension of the head portion 71 is greater than external diameter of the outer periphery of the plunger or driving means 54. Axial movement of the plunger or driving device 54 results in pivotal displacing of the trap door 78 as indicated in FIGURE 3 and the plunger or driving means 54 is located laterally to one side or end of the chute 74 so as to prevent movement of a subsequent fastening device 70 from the end of the chute. The trap door 78 has a connection at an end thereof remote from the pivot 76 such that a spring 80 under tension between the trap door and a post 81 is fixed to the guide pin 67. An upwardly extending limit stop 82 can be provided on the base 21 and can serve as a stop for limiting movement and positioning of the table 64 as illustrated in FIGURES 2–5. Thus the table 64 can be moved against the bias of spring 68 only to a predetermined location and simultaneously the hollow end 69 of the plunger or driving means 54 engages the stem portion 72 of a fastening device 70 which has been fed to one side of the trap door 78. The trap door 78 is urged resiliently to a position transverse to the path of movement of the driving means 54 and normally is strongly maintained in this position until the driving means 54 effects displacement thereof as represented in FIGURE 3.

It is to be understood that the plunger or driving means 54 is actuated in response to engagement of a pin or post 25 which has previously effected the drilling of the aperture A in the sealing strip S. The same post or pin 25 first actuates the drill and then actuates the switch 29 for supply of fluid under pressure to the actuator 51. Continued supply of fluid under pressure to the actuator 51 results in further axial movement of the plunger or driving means 54 under urging of the piston 52 so as to compress also the stiffer and more rigid spring means 62. During compression of this spring means 62, the hollow end 69 of the plunger 54 in engagement with a fastening device 70 forces the head portion 71 thereof to deflect the trap door 78 against the bias of spring 80 and the fastening device 70 clings for the time being to the hollow end of the plunger 54 during movement thereof axially through the aperture or hole 65 in the plate 64. During lowering of the plate 64 against the limit stop or abutment 82 there was a simultaneous positioning and fitting of laterally spreadable resilient finger means generally indicated by numeral 84. The first positioning of these finger means 84 is illustrated in FIGURE 2 wherein axial end portions 85 of the finger means 84 fit into an aperture A in the sealing strip S. In the position of FIGURE 2 the trap door 78 is still closed and the plunger together with the fastening device 70 have not moved to a downward position represented in FIGURE 3. The finger means 84 include funnel-like guide portions 86 suitably secured or welded to a fastening ring 87 carried or attached to an underside of the plate 64. Inner peripheral edges of the guide portions 86 of the finger means are engaged by an outer periphery of the head portion 71 of fastening device 70 so as to effect progressive dilating or expansion and spreading of the elastomeric material of the sealing strip S so as to enlarge the aperture A as illustrated in FIGURE 3. The straight ends 85 of the finger means are also separated laterally and radially outwardly from each other to an angular position relative to the axis or center line of the plunger 54 and the resilient elastomeric material of the strip means S is spread to a width exceeding the lateral dimension or width of the cavity C extending longitudinally in the sealing strip S. It is noted that each of the apertures A is drilled in a first stop or station of the apparatus can be made to a diameter substantially equalling that of the stem portion 72 of the fastening devices but the dilating as effected by the finger means 84 results in a step of laterally opening the cavity C to a width sufficient to admit the head portion 71 of each fastening device 70 in a predetermined location. There may be regularly spaced and irregularly spaced lateral apertures A on one side of the sealing strip S and communicating with the cavity C extending longitudinally therein in accordance with the positioning of pins or posts 25 noted earlier for tripping the drilling and inserting mechanisms in accordance with the present invention. Use of the hollow drill 35 with a side opening 37 noted and shown with reference to FIGURE 8 permits removal of the scrap 38 where an aperture is drilled and thus the scrap piece 38 cannot interfere with placement of fastening devices relative to the cavity C. The twisting or screwing action of the drill 35 urges the scrap pieces 38 through the lateral opening 37 during the drilling step in accordance with the present invention.

It is to be noted that the plunger or driving device 54 continues to move axially such that the head portion 71 of the fastening device 70 effects the radial spreading apart of the ends 85 of the finger means 84 until the head portion 71 fits into the cavity C as illustrated in FIGURE 4.

Figure 5:
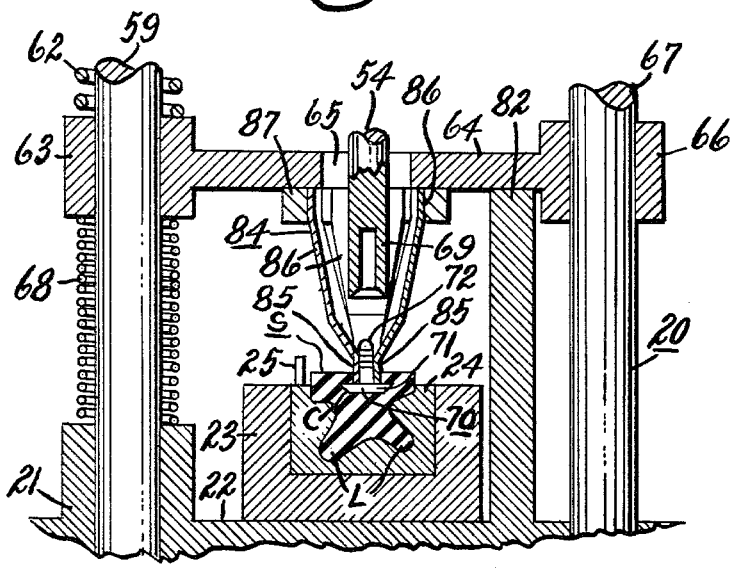

When the head portion 71 fits into the cavity C of the strip S the ends 85 of the finger means 84 can snap radially inwardly against an outer periphery of the hollow end 69 of the plunger or driving means 54 and then the ends 85 abut against one side of the head portion 71 as illustrated in FIGURE 4. The elastomeric material of the strip S also can return a limited distance radially inwardly though the aperture remains dilated and the resilient material of the strip together with the ends 85 of the finger means 84 serve to hold the head portion 71 in the cavity C while the plunger means 54 is permitted to retract under urging of the compression spring 62 upon release of fluid pressure on one side of the piston 52 of actuator 51. This step of retracting the plunger 54 is illustrated in FIGURE 5. As noted earlier, during retracting of the plunger or driving means 54 the friction fit of the stem portion of the fastening device is terminated and the ends 85 of the finger means 84 aid in holding the head portion 71 of the fastening device in the cavity C of the elastomeric sealing strip S.

FIGURE 6 illustrates the plunger or driving means 54 fully retracted so that the hollow end 69 thereof returns to a position above the trap door 78 and a subsequent fastening device 70 slides from the chute 74 onto the trap door 78 against the abutment 79. As the plunger 54 is retracted to its initial position, the spring means 62 and 68 effect upward shifting of the plate 64. Also, upon retraction of the plate 64 to its initial position, the ends 85 of the finger means 84 separate from the stem portion 72 of the fastening means 70.

FIGURE 7 illustrates the finger means 84 including ends 85 thereof. The fastening member 87 and a fragment of plate 64 can also be seen in FIGURE 7.

In FIGURE 8 the finger means 84 including ends 85 are shown also in a position retracted from a fastening means 70 inserted relatively to the sealing strip S in accordance with the present invention. A series of pegs or pins 25 can be seen in FIGURE 8 and it is noted that in the righthand portion of this view there are a pair of such pegs or pins closer together such that at least three fastening means 70 can be fitted to the sealing strip S within a shorter distance of each other and thus the head portions 71 of each of the fastening means can be used to hold the sealing strip relative to an arcuate surface of a mounting panel apertured such as on a vehicle door.

It is to be noted that each of the pegs or pins 25 serves to actuate the drilling means in a first station and subsequently the plunger and spreading mechanism of the finger means in a second station. The elastomeric sealing strip can be subjected to feeding through these stations in a continuous belt-like fashion or can be fed longitudinally in strips of predetermined length to fit a particular vehicle door. It is noted that the same apparatus can be used to effect drilling of apertures in the sealing strip and dilating of the apertures for inserting of the head portions of the plastic nail-like fastening devices in a controlled programming determined by the positioning of the pins or pegs 25. By use of a feeder means 24 having pins or pegs 25 in differing patterns it is possible to program operation of the drilling and inserting mechanisms to correspond with required location of fastening devices for various door structures on differing motor vehicles. Thus basically the same apparatus can be used to effect placement of fastening devices in standardized sealing strips but in differing locations as required for a particular door structure. For example, on some motor vehicles the front door had corners corresponding to contour of a "wrap-around" windshield and in acute angular positions it is necessary to provide fastening devices 70 in closer relationship to each other so as to avoid buckling and lack of proper sealing relative to such acute angles in certain corners. Also it is to be noted that the sealing strip could be moved at a continuous rate and that the drilling and inserting mechanisms could be movable therewith in predetermined locations for a predetermined length of time during which the drilling as well as the inserting operations occur. A matter of relative movement during the drilling and inserting steps can result in a saving of time so far as the inserting operation is concerned. The plunger or driving means 54 serves to open and displace the trap door as well as to spread a total of four resilient metal finger means for dilating the elastomeric material of the strip means S. The ends of the fingers serve to grasp the stem portions of the fastening devices and the ends of the finger means in a fully lowered position will not extend into the cavity C but will remain slightly to one side thereof to permit the head portions 71 of the fastening devices 70 to snap fit into the cavity C. The ends 85 of the finger means hold the head portion 71 of each of the fastening devices into the cavity C while the plunger or driving means 54 can be retracted from the frictional engagement thereof with the stem portion of each of the fastening devices. The flaring out of the ends 85 of the spring-like finger means 84 can assist in piloting the head portion of each of the fastening devices through an outwardly extending funnel into the cavity C. The trap door 78 is sufficiently counterbalanced by the tension spring 80 to hold a single fastening device in a proper position with the stem projecting upwardly and resting on the head portion so as to permit pickup by the hollow end 69 of the plunger means 54. The tension spring 80 must be sufficiently strong to hold the trap door and a single fastening device in proper position to keep the fastening device from dropping off of the trap door. Differential functioning of the spring means 62 and 68 during progressive compression thereof permits use of a single actuator and piston reciprocable therein for axially moving the plunger means 54 downwardly for functioning as described earlier. The spring means 62 and 68 return the plunger and other inserting components to a retracted position in response to release of fluid pressure on one side of the piston 52. It is to be understood that a suitable delay means can be used to hold the sealing strip in either of the two predetermined stations for a predetermined length of time during which either the drilling step or the inserting operation can occur.

It would be possible to have the inserting mechanism operable upon a rotatable drum having a plurality of feeder tracks or fixtures such as 24 located therein such that the drum could be indexed around an arcuate path and the drilling and inserting operations could occur progressively in certain stations while sealing strips of elastomeric material can be manually fitted into the feeding fixtures at other stations. Thus the procedure of drilling and inserting the fastening devices could be speeded considerably where high volume production is required. It is to be noted that the procedure and apparatus in accordance with the present invention requires only a minimum of manual handling of either fastening devices or sealing strips of elastomeric material and the automated operation of the procedure permit a minimum of production control and inspection which are desirable to save time and reduce cost of labor and material.

It is to be noted that head portions 71 of the fastening devices 70 can be annular, oblong or rectangular in shape and the apparatus described thus far can be used particularly with annular or round head portions 71. In FIGURE 9 there is an illustration of another driver mechanism which can be used in place of that shown in FIGURES 1–8 of the drawings. In the structure of FIGURE 9 there is provided a driver means 154 having a pin or dowel 155 fitted transversely thereto so as to fix an end of a link or arm 156 to move with the driver or plunger 154. The link or arm 156 is biased upwardly under force of a spring 162 located concentrically around a post or rod 164. One end of spring 162 abuts against an underside of the arm 156 and an opposite spring end abuts against an angular ring 165 fixed to the rod 164 by means of a set screw or pin 166. The spring 162 is compressed upon actuation and axial shifting of the plunger or driver 154 which can be carried by a piston similar to that indicated by reference numeral 52 in FIGURE 1. The driver or plunger 154 moves substantially parallel to the rod 164 and this parallel relationship is maintained by a secondary or lower link-like arm portion 168 secured by a set screw or pin and the like indicated by reference numeral 169 fitted transversely relative to the driver 154. Engagement of this secondary arm or member 168 against an underside of the ring 165 serves as a limit to upward movement of the driver during retracting thereof under urging of the compression spring means 162. The rod 164 can move to and fro for a limited distance between an upper side of the arm 156 and an underside of a fixed limit stop or projection 170 that can be secured to a support such as the base 21 and the like. A secondary ring or stop member 172 is held to an upper end of the rod 164 by a set screw, pin or dowel 173 and engagement of the member 172 along an upper side of the stop 170 limits the downward movement of the rod 164. A tension spring 174 can have one end hooked or fitted to a projection 175 near a lower end 176 of the rod 164. A fulcrum means 177 for a lever 178 can be provided adjacent to the end 176 of the rod 164. As noted earlier, one end of the tension spring 174 is attached to the projection 175 and an opposite end of this spring is attached to a central part of the lever 178. A lower end 179 of the driver or plunger 154 abuts against one end of the lever 178 and an opposite end of the lever is provided with a hollow cup-like portion 180 adapted to hold a stem portion similar to that identified by reference numeral 72 previously referred to.

FIGURE 10 illustrates a fastening device generally indicated by numeral 190 including a head portion 191 and a stem portion 192 integral therewith. As is apparent in the view of FIGURE 10, the head portion 191 has an oblong shape and reference can be made to the co-pending application of S.N. 118,918—Moorman filed June 22, 1961 now Patent 3,139,784—Moorman issued July 7, 1964, as to the specific configuration of the stem portion 192. The oblong head portion 191 has opposite ends 193 which fit longitudinally in alignment with a cavity such as C in the sealing strip S described earlier.

In the inserting mechanism illustrated by FIGURE 9, it is noted that there is shown a stem portion 192 held relative to the hollow cup-like or socket portion 180 and one of the ends 193 of the head portion 191 of the fastening device 190 can be seen as the end 193 engages an aperture A previously drilled to extend laterally from a cavity C of the sealing strip S. Supply of fluid pressure to a piston for axial movement of the driver 154 results in downward movement of the end 179 so as to cause pivoting of the lever 178 about the fulcrum 177 against the tension of spring 174. During this rocking of the lever 178 the one end 193 of the fastening device engages and dilates or expands the aperture A of the sealing strip S so as to stretch elastomeric material surrounding the aperture. The rocking action can traverse an arc of substantially 90° so that there is a 45° rocking action on each side of a vertical axis through the rod 164. During this rocking action the elastomeric material is stretched sufficiently to permit an opposite end of the oblong head portion to snap through the aperture and longitudinally into alignment with the cavity C into which the head portion is to be fitted. Thus after the steps of feeding the elastomeric sealing strip along a predetermined path and aperturing the sealing strip in predetermined locations so as to provide access to a longitudinally extending cavity therein, there is a dilating or expansion of the elastomeric sealing strip in a location where the aperturing occurred at a previous station and a driving means such as 54 or 154 can effect operation of components for inserting a plastic nail-like fastening device with a head portion thereof to fit into the cavity of the sealing strip during the dilating or expanding of the elastomeric material of the sealing strip. Holding of a stem portion of the fastening device in either event terminates upon retraction of the driver or plunger under spring urging thus releasing the plastic fastening device to remain with the head portion thereof in the cavity of the elastomeric sealing strip. Suitable pegs or pins similar to those indicated by reference numeral 25 can be used for effecting drilling and actuation of the plunger or driver means in the mechanism of FIGURE 9 also. For the mechanism of FIGURE 9 the trap door can be eliminated and fastening devices can be fed from a chute or can be manually inserted directly into the hollow cup-like portion having a diameter of the hollow interior substantially equal to the peripheral diameter of ring means on the stem portion of the fastening device. A suitable shuttle bar mechanism could be used to feed the nail-like plastic fastening devices to the hollow cup-like portion or to the hollow ends 69 of the plunger and downward movement of the plunger could result in a spreading of the bars to permit inserting of the fastening device to occur relative to the cavity C of the sealing strip S of elastomeric material.

FIGURE 11 illustrates another fastening device indicated generally by numeral 194 and having a head portion 195 integral with a stem portion 196. The stem portion includes ring means and a double tapered pilot end similar to that described in the co-pending application S.N. 118,918—Moorman now Patent 3,139,784—Moorman issued July 7, 1964, as referred to earlier. However, the head portion 195 is modified to have a helical slot 198 cut out as a semi-arcuate partial spiral to facilitate fitting of the head portion to a cavity of the sealing strip such as S of elastomeric material laterally apertured to a size hole substantially of a diameter equal to that of the stem portion. An apex-like end adjacent to the slot 198 and identified by reference numeral 199 in FIGURES 11 and 12 can establish engagement of the head portion relative to elastomeric material surrounding the aperture such as A in a sealing strip S. An arcuate configuration or gradual tapering from the apex 199 results in laterally expanding or dilating of the elastomeric material so as to permit the head portion 195 to be threaded through the aperture A and into the cavity C. The turning or twisting necessary for such threading action can be transmitted from a hollow end 69 of a plunger such as 54 when the plunger is subjected to a rotation or twist about its longitudinal axis once the plunger has been lowered while the hollow end 69 engages the stem portion 196 of the fastening device 194.

It is to be understood that in each of the embodiments disclosed herein the pegs or pins 25 can be used in each of two stations to synchronize drilling of an aperture and inserting of a plastic nail-like fastening device by means of a plunger reciprocally movable axially or in a twisting to and fro movement. Once the fastening devices have been inserted relative to an elastomeric sealing strip it is possible to use a suitable ball bearing roller and the like to cause unloading of the sealing strip with the fastening devices assembled thereto and flexibly removable from the feeding fixture such as 24.

While the embodiments of the present invention as herein disclosed constitute preferred forms, it is to be understood that other forms might be adopted.

What is claimed is as follows:

1. An elastomeric sealing strip and mounting means assembly procedure comprising, the steps of feeding the elastomeric sealing strip along a predetermined path, aperturing the sealing strip in predetermined locations so as to provide access to an internal longitudinally extending cavity from only one side of the elastomeric sealing strip externally thereof, dilating the elastomeric sealing strip for increasing size of the aperture in a location where said aperturing occurred, inserting individually in each location of said aperturing only one of a plurality of successively installable plastic nail-like fastening means each with a stem integrally joined to a head portion having at least one lateral dimension larger than diameter of said aperturing yet to fit into the cavity during said dilating that at least temporarily increases size of said aperturing, and releasing the plastic fastening means individually to remain with the head portion thereof in the cavity simultaneously upon said release there being a resilient return of the elastomeric sealing strip to a condition of size and shape substantially like that prior to said dilating though now snugly retaining the head portion of each fastening means with the stem thereof projecting through the locations of said aperturing along only the side of said dilating and said inserting.

2. Procedure for assembling an elastomeric sealing strip and a plurality of progressively installable plastic nail-like fastening devices each having a head portion integral with a stem portion, steps comprising, feeding an elastomeric strip with an internal cavity therein through a longitudinal path, drilling an opening normally smaller in diameter than at least one diagonal dimension of the head portion and extending from one side only into the cavity of the strip at each successive predetermined locations to receive individual fastening devices, dilating the elastomeric strip around the opening to a size temporarily slightly larger than that of the head portion, snap fitting successively and individually through each opening the head portion of only one of the plurality of fastening devices into the cavity while leaving the integral stem portion projecting through the opening to only one side of said sealing strip during said dilating, and terminating said dilating of the elastomeric strip around the opening while the head portion of the fastening device remains in the cavity and with the stem portion snugly projecting laterally out of the strip after the opening has returned to substantially normal diameter thereof that results from said drilling.

3. The procedure of claim 2 wherein here is synchronizing of said drilling and said dilating to occur in uniformly spaced intervals, said drilling being done with a hollow drill through which waste material of the sealing strip passes to avoid possible interference of the waste material with fastening device installation.

4. The procedure of claim 2 wherein said drilling and said dilating occur at irregular intervals longitudinally along the sealing strip for closer spacing of fastening devices where the sealing strip is to fit cornering upon installation for use.

5. The procedure of claim 1 wherein said aperturing of the sealing strip is accomplished by drilling in a first of two stations, said dilating that increases size of the aperture being accomplished in a second station.

6. The procedure of claim 1 wherein said dilating that increases size of the aperture of the elastomeric sealing strip occurs during a turning and twisting action of the head portion having helical slotting cut out as semi-arcuate partial spiralling to facilitate said inserting of the head portion of diameter larger than that of said aperturing.

7. The procedure of claim 1 wherein said dilating that increases size of the aperture of the elastomeric sealing strip occurs principally longitudinally of the strip due to oblong shape of the head portion of which width is less than length which is larger than diameter of said aperturing.

References Cited by the Examiner
UNITED STATES PATENTS

| | | | |
|---|---|---|---|
| 547,812 | 10/95 | Shedlock | 85—28 |
| 2,118,817 | 5/38 | Laursen | 29—450 X |
| 2,317,231 | 4/43 | Swedman | 85—28 |
| 2,716,804 | 9/55 | Johnson | 29—453 |
| 2,972,789 | 2/61 | Mathues | 20—69 |
| 2,987,812 | 6/61 | Donaldson | 29—453 |
| 3,005,255 | 10/61 | Wilson | 29—208 |
| 3,024,523 | 3/62 | Donaldson | 29—208 |

WHITMORE A. WILTZ, *Primary Examiner.*

JOHN F. CAMPBELL, *Examiner.*